US008037277B2

(12) United States Patent
Maeda et al.

(10) Patent No.: US 8,037,277 B2
(45) Date of Patent: Oct. 11, 2011

(54) INFORMATION PROCESSING APPARATUS AND COMPUTER-READABLE STORAGE MEDIUM

(75) Inventors: Seiji Maeda, Kawasaki (JP); Hidenori Matsuzaki, Kawasaki (JP); Yusuke Shirota, Fuchu (JP); Kazuya Kitsunai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 12/071,966

(22) Filed: Feb. 28, 2008

(65) Prior Publication Data

US 2008/0229036 A1 Sep. 18, 2008

(30) Foreign Application Priority Data

Mar. 15, 2007 (JP) ................................ P2007-067052

(51) Int. Cl.
*G06F 12/14* (2006.01)
*G06F 12/16* (2006.01)
(52) U.S. Cl. . 711/202; 711/161; 711/163; 711/E12.091; 711/E12.103

(58) Field of Classification Search .................. 711/161, 711/163, 202, E12.091, E12.103
See application file for complete search history.

(56) References Cited

U.S. PATENT DOCUMENTS

| 6,859,862 | B1 | 2/2005 | Liao et al. | |
| 7,290,107 | B2 * | 10/2007 | Day et al. | 711/163 |
| 2006/0047901 | A1 * | 3/2006 | Omura | 711/113 |

* cited by examiner

*Primary Examiner* — Yong Choe
(74) *Attorney, Agent, or Firm* — Nixon & Vanderhye, P.C.

(57) ABSTRACT

A computer-readable storage medium stores a program for causing a processor to perform a process including: acquiring a first address that specifies a start address of a first area on the main memory where a target data to be cached is stored and range information that specifies a size of the first area on the main memory; converting the first address into a second address that specifies a start address of a second area on the local memory, the second area having a one-to-n correspondence (n=positive integer) to a part of a bit string of the first address; copying the target data stored in the first area specified by the first address and the range information onto the second area specified by the second address and the range information; and storing the second address to allow accessing the target data copied onto the local memory.

12 Claims, 8 Drawing Sheets

FIG. 4

TAG ARRAY 20b

| | 15 | 16 | 17 | 18 |
|---|---|---|---|---|
| | TAG ADDRESS | VALID FLAG | DIRTY FLAG | LOCK FLAG |
| TAG 1-0 | 0x10F0 | 1 | 1 | 0 |
| TAG 1-1 | 0x200F | 0 | 0 | 0 |
| TAG 1-2 | 0x30F0 | 1 | 0 | 0 |
| TAG 1-3 | 0x4F00 | 1 | 0 | 1 |
| ... | ... | ... | ... | ... |
| TAG 1-255 | 0xFFF0 | 1 | 1 | 1 |

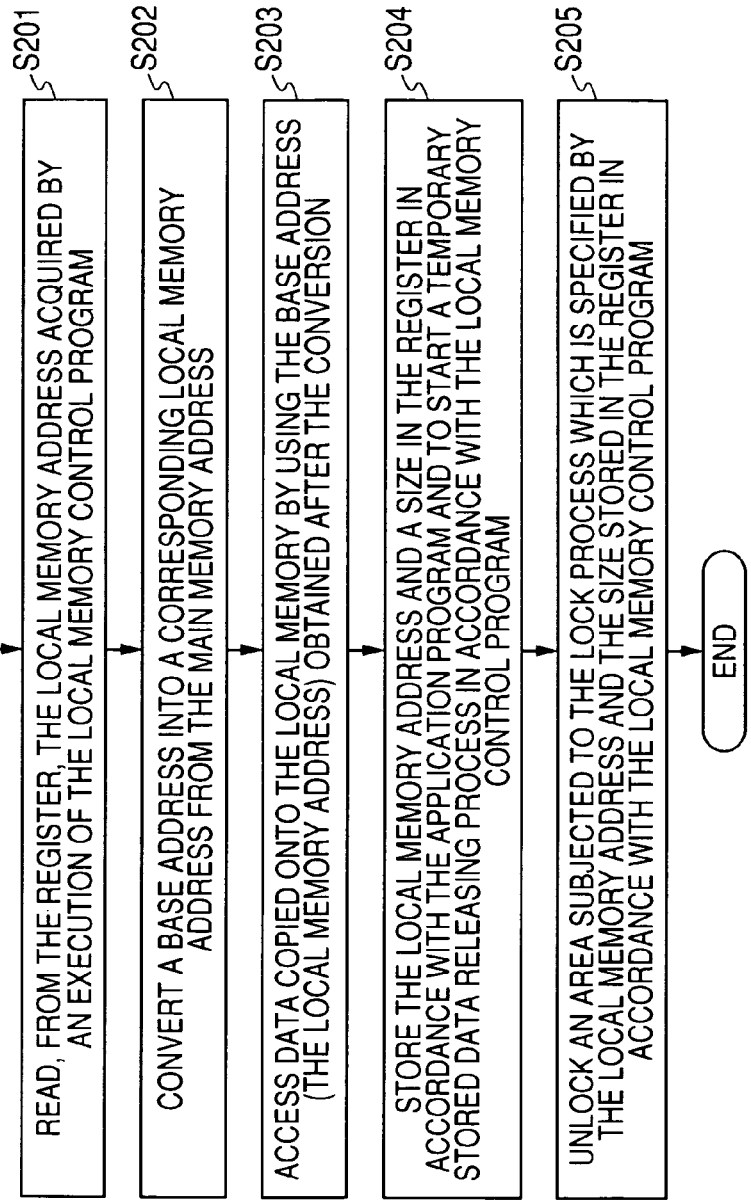

INFORMATION PROCESSING APPARATUS AND COMPUTER-READABLE STORAGE MEDIUM

RELATED APPLICATION(S)

The present disclosure relates to the subject matter contained in Japanese Patent Application No. 2007-067052 filed on Mar. 15, 2007, which is incorporated herein by reference in its entirety.

FIELD

The present invention relates to an information processing apparatus and a computer-readable recording medium that stores a program for causing a computer system to perform data processing.

BACKGROUND

In a recent computer system, there is widely used a temporary storage device, such as a cache memory or a local memory, which has a smaller capacity and a higher data transfer rate than those of a main memory, in order to compensate for a difference between a data processing speed of a processor and the data transfer rate of the main memory. The temporary storage device increases substantive data transfer rate in performing access the main memory and improve efficiency in data processing by the processor.

However, the temporary storage device is not capable of storing all of the data on the main memory. For this reason, it is necessary to replace the data stored in the temporary storage device with necessary data in accordance with a data access by the processor. However, in some cases, when data to be accessed in the near future by the processor are stored in the temporary storage device, the data may be replaced with other data in accordance with the data access by the processor. When this replacement occurs, the replaced data need to be re-read from the main memory when the processor needs to access the replaced data.

Therefore, there is proposed a technique for prohibiting the replacement of the data stored in a specific area of the temporary storage device. An example of such technique is disclosed in JP-A-2001-290705 (also published as U.S. Pat. Nos. 6,859,862 B1, 6,681,296 B2, and US 2002/0062424 A1).

In the technique disclosed in the document JP-A-2001-290705, it is necessary to determine whether or not the data to be accessed is stored on the temporary storage device every time the processor requests to access the temporary storage device.

SUMMARY

According to a first aspect of the invention, there is provided a computer-readable storage medium that stores a program for causing a processor to perform a process for accessing a local memory that caches a part of data stored in a main memory, the process including: acquiring (1) a first address that specifies a start address of a first area on the main memory where a target data to be cached is stored and (2) range information that specifies a size of the first area on the main memory; converting a part of a bit string of the first address into a second address that specifies a start address of a second area on the local memory; copying the target data stored in the first area specified by the first address and the range information onto the second area specified by the second address and the range information; and storing the second address to allow accessing the target data copied onto the local memory.

According to a second aspect of the invention, there is provided a computer-readable storage medium that stores a program for causing a processor to perform a process for accessing a local memory that caches a part of data stored in a main memory, the process including: acquiring (1) a first address that specifies a start address of a first area on the main memory where a target data to be cached is stored and (2) range information that specifies a size of the first area on the main memory; converting a part of a bit string of the first address into a second addresses that specify start addresses of each of second areas on the local memory; copying the target data stored in the first area specified by the first address and the range information onto selected one of the second areas specified by the second addresses and the range information; and storing the second addresses to allow accessing the target data copied onto the local memory.

According to a third aspect of the invention, there is provided an information processing apparatus including: a main memory that stores data; a local memory that caches a part of the data stored in the main memory; a processor that outputs a first address that specifies a start address of a first area on the main memory where a target data to be accessed is stored; and a control device that operates to: convert a part of a bit string of the first address into a second address that specifies a start address of a second area on the local memory; copy the target data stored in the first area specified by the first address and the range information onto the second area specified by the second address and the range information; and transmit the second address to the processor to allow the processor to access the target data copied onto the local memory.

BRIEF DESCRIPTION OF THE DRAWINGS

In the accompanying drawings:

FIG. 4 is a diagram showing an example of a tag array to be stored in the local memory according to the first embodiment;

FIG. 7 is a flowchart showing the process performed by the information processing apparatus according to the first embodiment;

FIG. 8 is a diagram showing an example of a lock range array stored in a local memory according to a second embodiment of the present invention;

DETAILED DESCRIPTION OF THE EMBODIMENTS

Referring now to the accompanying drawings, embodiments of the present invention will be described in detail.

First Embodiment

Figures 1, 2:
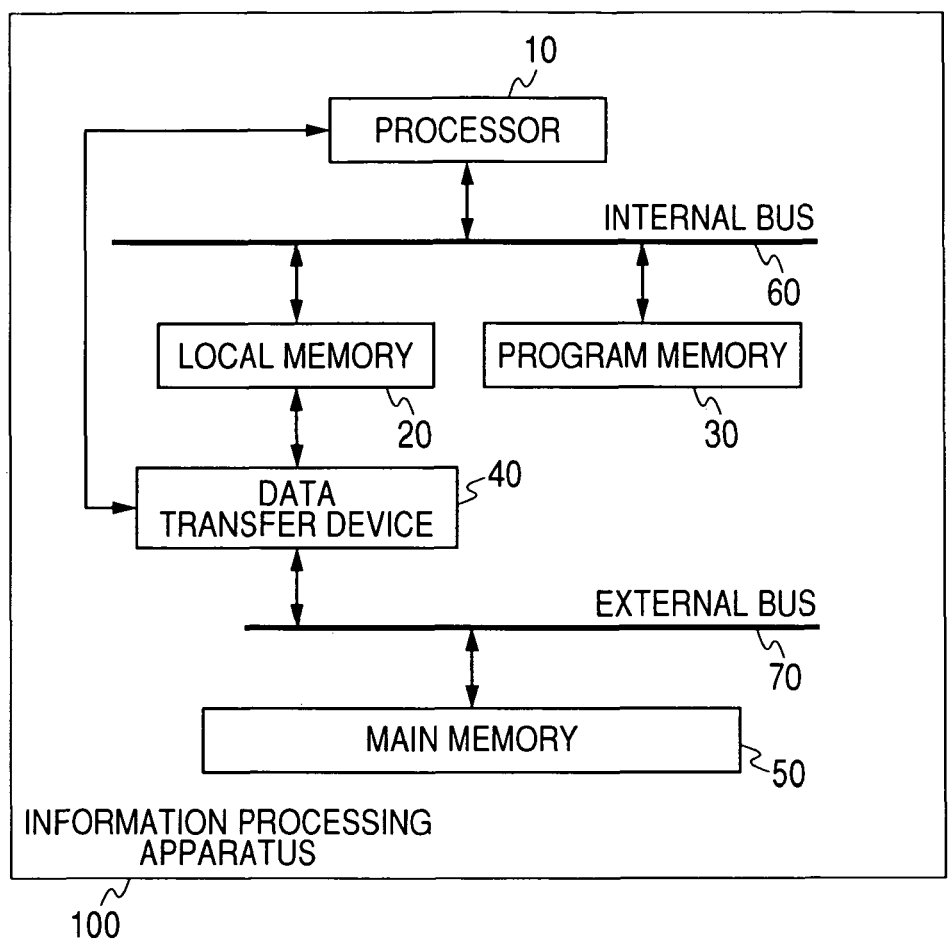
FIG. 1 is a block diagram showing a configuration of an information processing apparatus according to a first embodiment of the present invention.
FIG. 2 is a diagram showing an example of a main memory address output from a processor according to the first embodiment.

FIG. 1 is a block diagram showing a configuration of an information processing apparatus 100 according to a first embodiment of the present invention.

The information processing apparatus 100 includes: a processor 10 that performs a processing using data stored in a main memory 50; a program memory 30 that stores a program to be executed by the processor 10; a local memory 20 that stores a part of the data stored in the main memory 50; a data transfer device 40 that performs a data transfer between the main memory 50 and the local memory 20 in response to a request from the processor 10; and the main memory 50 that supplies data to the local memory 20 through the data transfer device 40.

The processor 10, the local memory 20 and the program memory 30 are connected through an internal bus 60. The data transfer device 40 and the main memory 50 are connected through an external bus 70.

The processor 10 executes a program stored in the program memory 30 or the local memory 20. For example, it is assumed that the processor 10 executes an application program 10a stored in the local memory 20. It is sufficient that a program to be executed by the processor 10 uses the data stored in the main memory 50, and the program may be any one of a firmware, a middleware or an operating system. The processor 10 stores, in a register (not shown), data to be used in executing the program and performing the processing.

The data transfer device 40 is implemented by a direct memory access controller (a DMA controller), for example, and transfers requested data from the local memory 20 to the main memory 50 or from the main memory 50 to the local memory 20 in response to a request from the processor 10.

The program memory 30 stores a program to be executed by the processor 10. The program memory 30 is implemented as an RAM (Random Access Memory) or an ROM (Read Only Memory) The local memory 20 is implemented as the RAM, stores the program to be executed by the processor 10, and temporarily stores (caches) a part of the data stored in the main memory 50.

FIG. 2 shows an example of a main memory address to be output from the processor 10.

A bit width of the main memory address may be a bit width that is capable of-specifying all the address of the main memory 50. For example, when each main memory address specifies 1-byte data stored in the main memory 50, the capacity of the main memory 50 can be set to be 4 GB at a maximum when a bit width of the main memory 50 is 32 bits.

The main memory address is configured by a tag address having a 16-bit width, a line number having an 8-bit width and an offset having an 8-bit width. As shown in FIG. 2, the tag address is "0x1234", the line number is "0x56" and the offset is "0x78". The tag address, the line number and the offset will be described later.

Figure 3:
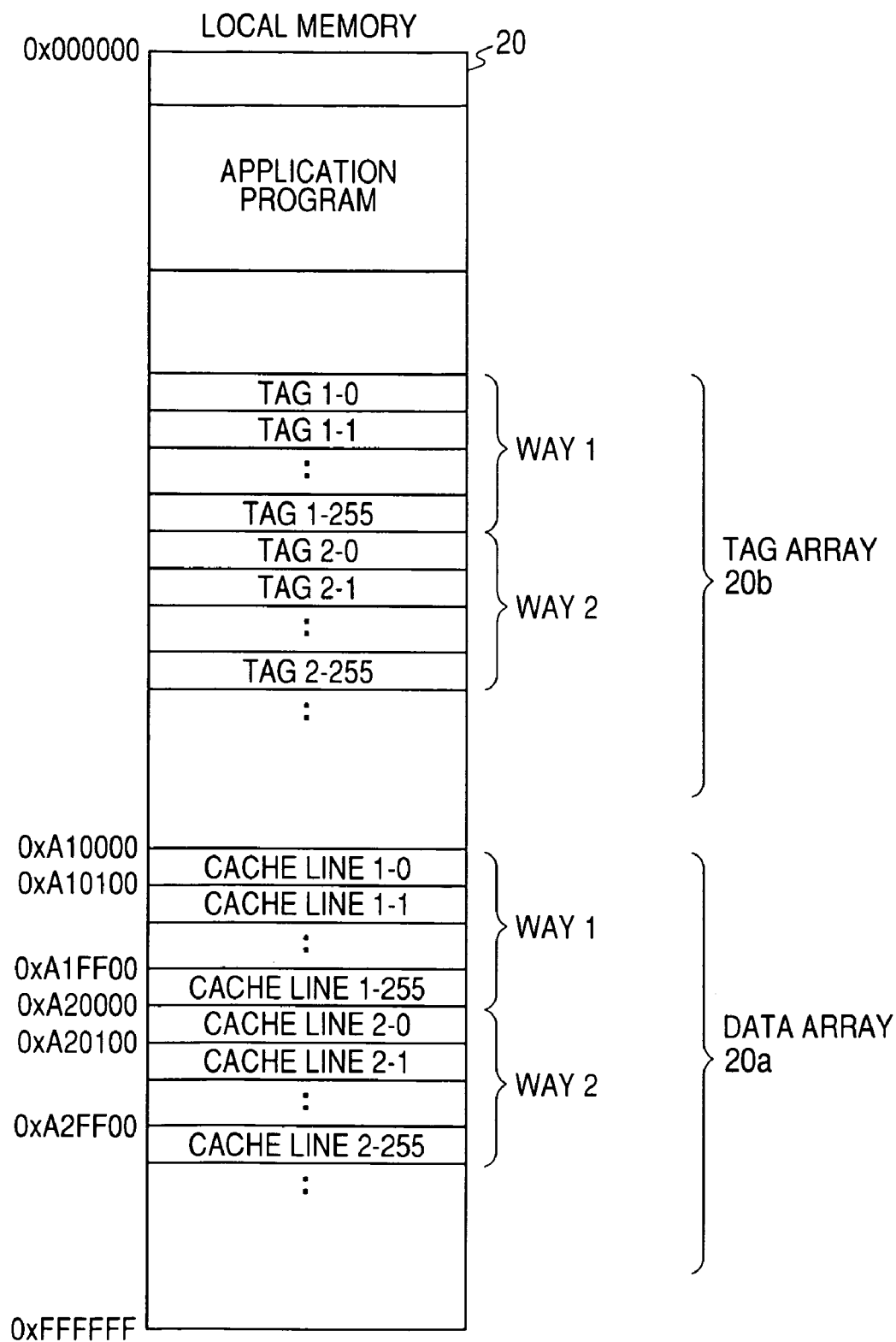
FIG. 3 is a diagram showing an example of a local memory according to the first embodiment.

FIG. 3 shows a data structure of the local memory 20 according to the first embodiment. In FIG. 3, a cache line of a data array and management information (tag) of a tag array are identified by "(way number)-(line number)" and are thus described.

The local memory 20 stores an application program to be executed by the processor 10, a data array 20a for temporarily storing data on the main memory 50 by a cache line basis (a cache line has a size of 256 bytes), and a tag array 20b for storing a tag address of data to be stored in the data array 20a and the management information (tag). The local memory 20 is accessed by a local memory address having a range from "0x0000001" to "0xFFFFFF". For example, a capacity of the local memory 20 is set to be 16 MB and 1-byte data stored in the local memory 20 are specified by the local memory address from the processor 10.

The line number is used for identifying the cache line of the data array 20a. The tag address is used for identifying the data stored in the cache line of the data array 20a. The offset is used for identifying an order of any of the data (256 bytes) stored in the cache line of the data array 20a.

For example, the data array 20a and the tag array 20b are set to be four ways. More specifically, it is assumed that four cache lines (e.g., cache lines 1-1, 2-1, 3-1 and 4-1) and management information (e.g., tags 1-1, 2-1, 3-1 and 4-1) assigned for each of the cache lines are specified by a single line number (e.g., a line number of "0x01"). The number of the cache lines possessed by the data array 20a and that of the management information (tags) possessed by the tag array 20b are equal to each other.

The line number of the main memory address shown in FIG. 2 has an 8-bit width, and a line number of "0 to 255" can be specified. Therefore, the number of the management information (tags) added every cache line held by the data array 20a and every cache line held by the tag array 20b is "1024" obtained by integrating the number "256" which can be specified by the line number and the number "4" of the ways.

A start address of the way 1 of the data array 20a is a local memory address of "0xA10000" and a start address of the way 2 of the data array 20a is a local memory address "0xA20000".

FIG. 4 shows an example of the management information (tag) added for each of the cache lines stored in the tag array 20b of the way 1.

The tag array 20b has 256 tags from "tag 1-0" to "tag 1-255" in the way 1. Each of the tags is configured by a tag address having a 16-bit width, a valid flag having a 1-bit width, a dirty flag having a 1-bit width and a lock flag having a 1-bit width.

The tag address indicates a tag address of the data stored in the cache line of the corresponding data array 20a. The valid flag indicates whether the data stored in the cache line of the corresponding data array 20a are valid "1" or invalid "0". The dirty flag indicates that write is performed for the data stored in the cache line of the corresponding data array 20a when the valid flag is "1". The lock flag indicates that the replacement of the data stored in the cache line of the corresponding data array 20a with the other data is prohibited "1" or is not prohibited "0".

In FIG. 4, the contents stored in the "tag 1-0" indicate that data stored in "cache line 1-0" are valid (the valid flag of "1") and overwrite is performed over the data (the dirty flag of "1"), and the tag address is "0x10F0". Similarly, the "tag 1 -1" indicates that data stored in the "cache line 1-1" are invalid (the valid flag of "0") and the tag address is "0x200F". Moreover, the "tag 1-2" indicates that data stored in the "cache line 1-2" are valid (the valid flag of "1") and the tag address is "0x30F0". Furthermore, the "tag 1-3" indicates that data stored in the "cache line 1-3" are valid (the valid flag of "1") and the replacement of the data with the other data is prohibited (the lock flag of "1"), and the tag address is "0x4F00".

Figure 5:
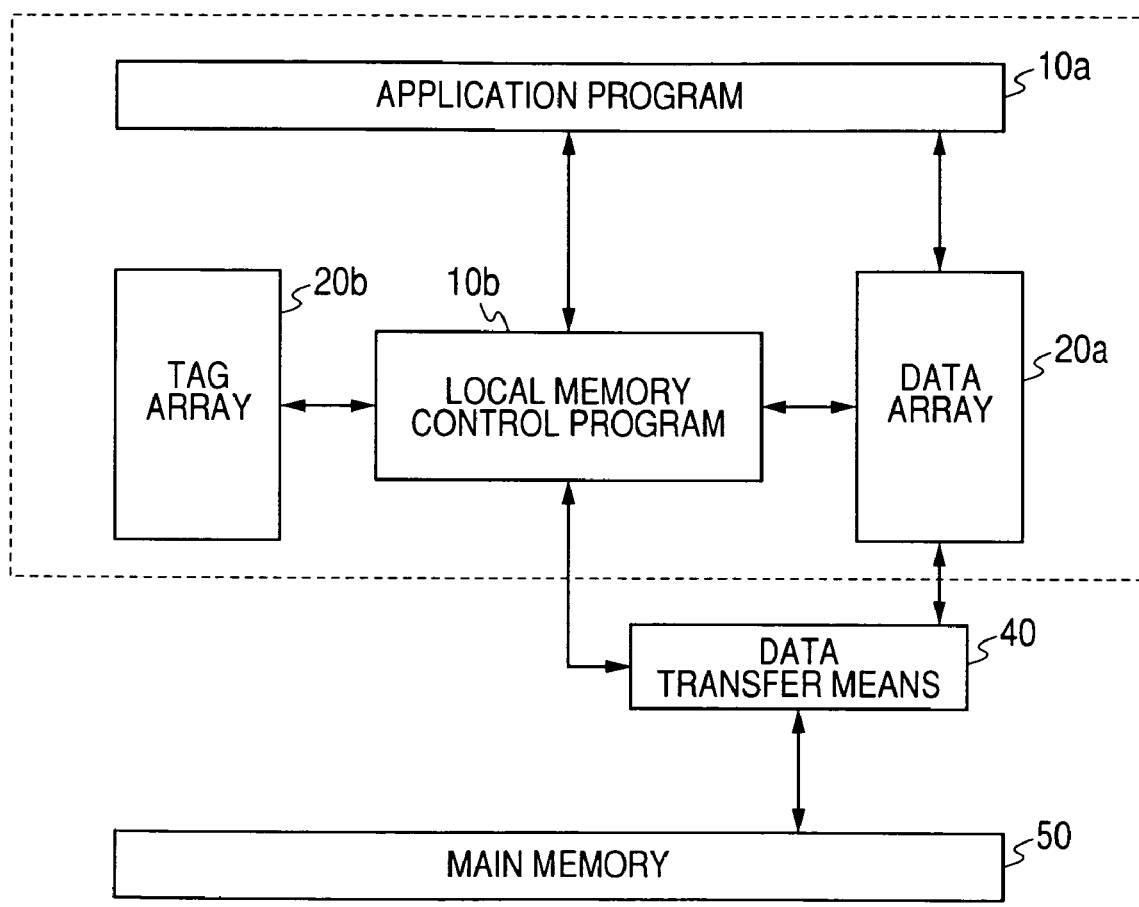
FIG. 5 is a block diagram showing an input/output relationship of data to be processed by a program executed by the processor according to the first embodiment.

FIG. 5 is a diagram showing an input/output relationship of data between a local memory control program 10b and the application program 10a which are executed by the information processing apparatus 100 according to the first embodiment of the invention and the data array 20a and the tag array 20b of the local memory. The data array 20a is accessed by the processor 10 for executing the local memory control program 10b and the application program 10a, and the tag array 20b is accessed by the processor 10 for executing the local memory control program 10b.

Figure 6:
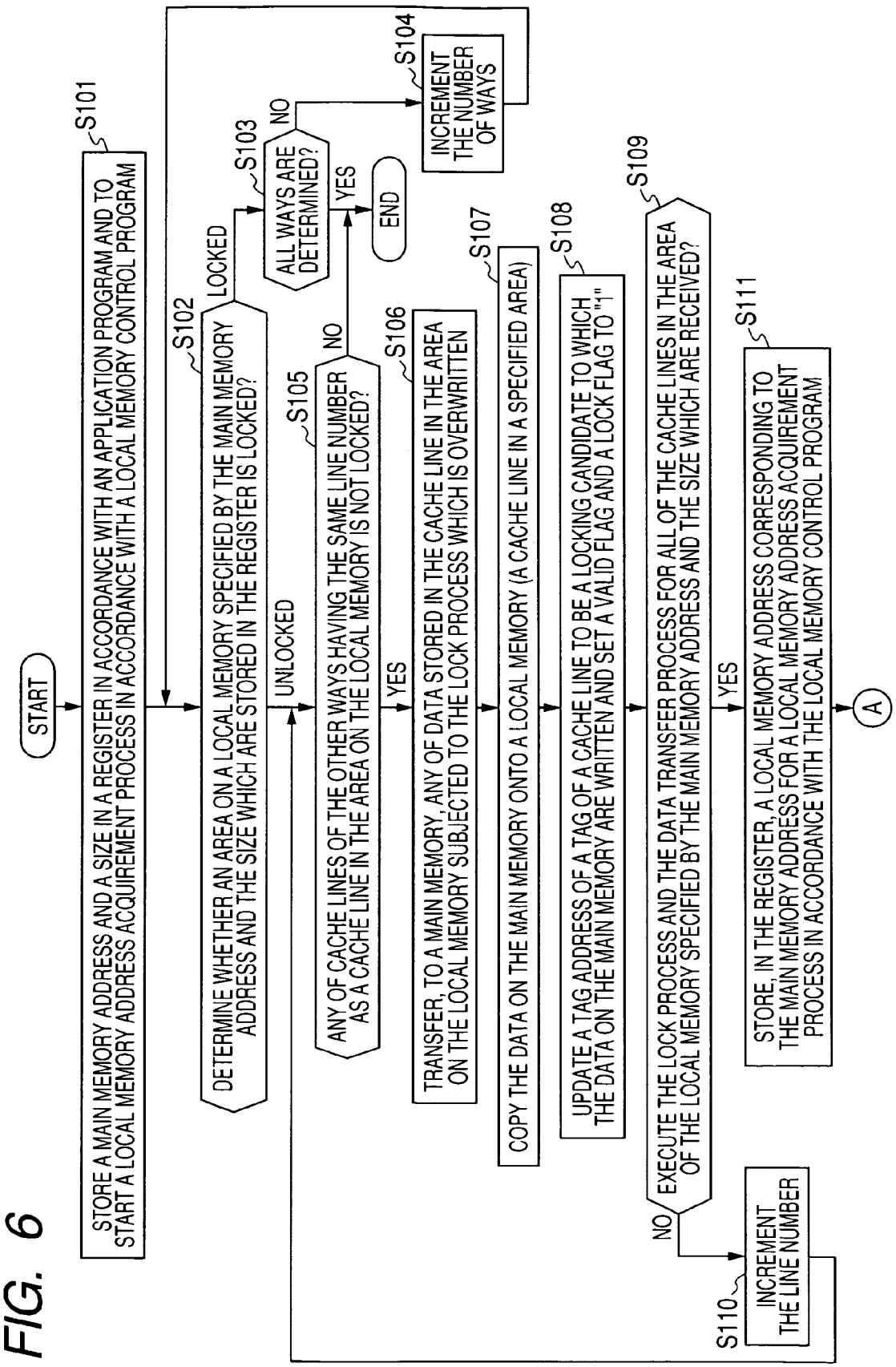
FIG. 6 is a flowchart showing a process performed by the information processing apparatus according to the first embodiment.

FIGS. 6 and 7 are flowcharts showing a process performed by the information processing apparatus 100 according to the first embodiment.

Description will be given to a process to be performed when executing a local memory address acquirement process in order to allow the processor 10 to access the data stored in the main memory 50 as shown in FIG. 6.

First, the processor 10 stores, in a register, a main memory address specifying a position of an area to be accessed (for example, 0xFFFF0000) and a size specifying a size of the area to be accessed (for example, 768 bytes) in accordance with the application program 10a. The processor 10 starts the local memory address acquirement process in accordance with the local memory control program 10b (Step S101).

The main memory address (0xFFFF0000) and the size (768 bytes) indicate areas of main memory addresses of "0xFFFF0000 to 0xFFFF02FF" in the main memory 50. It is sufficient that information to be stored in the register by the processor 10 in accordance with the application program 10a can specify a certain area on the main memory 50. In other words, in order to indicate the areas of the main memory addresses of "0xFFFF0000 to 0xFFFF02FF", the main memory address "0xFFFF0000" and an address range "0x0000300" may be specified and the main memory address "0xFFFF0000" and the number of the cache lines (three which corresponds to 768 bytes) may be specified.

The data stored in the area on the main memory 50 specified by the above-described method are specified by data to be accessed by the processor 10 for executing the application program 10a.

Next, the processor 10 reads the main memory address (0xFFFF0000) and the size (768 bytes) which are stored in the register in the execution of the application program 10a in accordance with the local memory control program 10b. In accordance with the local memory control program 10b, then, the processor 10 determines whether an area on the local memory 20 corresponding to the main memory address and the size-which are read has already been locked or not (Step S102).

More specifically, the processor 10 acquires a line number (0x00) indicated as a bit 16-23 of the main memory address (0xFFFF0000) stored in the register in accordance with the local memory control program 10b. In accordance with the local memory control program 10b, thereafter, the processor 10 can store the received size (768 bytes) from the tag array 20b stored in the local memory 20 and reads the management information (the tags 1-0, 1-1 and 1-2) of the areas (the cache lines 1-0, 1-1 and 1-2) which are placed continuously from the "cache line 1-0" specified by the way 1 and the line number (0x00). In accordance with the local memory control program 10b, subsequently, the processor 10 determines whether all of the lock flags of the "tags 1-0, 1-1 and 1-2" are "0" or not.

When determined that the area on the local memory 20 corresponding to the main memory address and the size which are read has already been locked (lock in Step S102), the processor 10 determines whether the processing of the Step S102 is performed for all of the ways possessed by the local memory 20 or not in accordance with the local memory control program 10b (Step S103). When determined that the processing of the Step S102 has been performed for all of the ways possessed by the local memory 20 (Yes in Step S103) the processor 10 performs an error processing in accordance with the local memory control program 10b and ends the operation. When determined that the processing of the Step S102 has not been performed for any of the ways possessed by the local memory 20 (No in the Step S103), a way having a greater way number by one is subsequently selected (Step S104) and the processing of the Step S102 is performed again.

On the other hand, when determined that the area on the local memory 20 corresponding to the main memory address and the size which are read is not locked (for example, all of the lock flags of the tags 1-0, 1-1 and 1-2 are "0"), the processor 10 first determines whether a problem is caused by locking the "cache line 1-0" or not in accordance with the local memory control program 10b.

More specifically, the processor 10 determines whether any of the cache lines (cache lines 2-0, 3-0 and 4-0) of the other ways has the same line number (0x00) as the "cache line 1-0" and is not locked in accordance with the local memory control program 10b (Step S105). The local memory 20 has four ways. In accordance with the local memory control program 10b, therefore, the processor 10 determines whether or not the lock flag of "0" is set to at least one of the "tags 2-0, 3-0 and 4-0" from the tag array stored in the local memory 20.

When determined that all of the cache lines (the cache lines 2-0, 3-0 and 4-0) of the other ways have the same line number (0x00) as the "cache line 1-0" and are locked (No in the Step S105), the processor 10 performs an error processing in accordance with the local memory control program 10b and ends the operation. By performing the processing, it is possible to prevent all of the cache lines specified to have a certain line number (in this case, 0x00) from being brought into a locking state.

On the other hand, when determined that all of the cache lines (the cache lines 2-0, 3-0 and 4-0) of the other ways have the same line number (0x00) as the "cache line 1-0" and are not locked (Yes in the Step S105), the processor 10 performs a data transfer process for the "cache line 1-0", in accordance with the local memory control program 10b.

More specifically, the processor 10 reads the management information (the tag 1-0) of the "cache line 1-0" from the local memory 20 in accordance with the local memory control program 10b. If "1" is set to the valid flag of the "tag 1-0" and "1" is set to the dirty flag, the data stored in the "cache line 1-0" are transferred to the main memory 50 (Step S106).

In accordance with the local memory control program 10b, the processor 10 restores the main memory address of the "cache line 1-0" by the line number (0x00), the tag address (0x10F0) stored in the tag 1-0 and the offset (0x00) Then, the processor 10 controls the data transfer device 40 in accordance with the local memory control program 10b, and transfers the data stored in the "cache line 1-0" to an area specified by the main memory address (0x10F00000) which is restored.

Next, the processor 10 controls the data transfer device 40 in accordance with the local memory control program 10b, and transfers data in an area specified by the main memory address (0xFFFF0000) and a size (784 bytes) which are stored in the register corresponding to 256 bytes (0xFFFF0000 to 0xFFFF00FF) to the "cache line 1-0" of the local memory 20 and copies the same data in accordance with the application program 10a (Step S107).

In accordance with the local memory control program 10b, then, the processor 10 updates the tag address to "0xFFFF" with respect to the management information (tag 1-0) of the "cache line 1-0" stored in the local memory 20 and sets the valid flag to "1". In accordance with the local memory control program 10b, moreover, the processor 10 sets the lock flag of the "tag 1-0" to "1" in order to perform a lock process for the "cache line 1-0" (Step S108). In a case in which it is predicted that there is a high possibility that the data stored in the "cache line 1-0" might be overwritten, it is also possible to set the dirty flag to "1".

At the Steps S106 to S108, in accordance with the local memory control program 10b, the processor 10 transfers, to the main memory 50, the data stored in the area on the local memory 20 onto which the data of the main memory 50 are copied. In accordance with the local memory control program 10b, then, the processor 10 transfers (copies) the data of the main memory 50 to an empty area of the local memory 20.

In a case in which the data stored in the area of the local memory 20 are identical to the data to be copied onto the main memory 50, therefore, it is preferable to omit the process to be executed in the Steps S106 to S108 and to set the lock flag to "1".

A method of determining whether the data stored in the area of the local memory 20 are identical to the data to be copied onto the main memory 50 can be executed depending on whether the tag address of the data stored in the area of the local memory 20 is identical to the tag address of the data to be copied onto the main memory 50, that is, the tag address of the main memory address stored in the register by the processor 10 in accordance with the application program 10a.

Next, in accordance with the local memory control program 10b, the processor 10 determines whether or not the lock process and the data transfer process are performed for all of the cache lines in the area of the local memory 20 which are specified to have the received main memory address and size (Step S109).

If the lock process and the data transfer process are not performed for any of the "cache lines 1-0, 1-1 and 1-2" in the area of the local memory 20 which are specified to have the received main memory address (0xFFFF0000) and size (784 bytes) (No in the Step S109), the line number is incremented (Step S110) and the operations in the Steps S105 to S108 are repetitively performed. More specifically, referring to the "cache lines 1-1 and 1-2", the operations in the Steps S105 to S108 are also performed repetitively.

On the other hand, the lock process and the data transfer process are performed for all of the cache lines in the area of the local memory 20 which are specified to have the received main memory address and size (Yes in the Step S109), the processor 10 then writes, to the register, a local memory address (0xA10000) corresponding to the main memory address (0xFFFF0000) as a result of the local memory address acquirement process in accordance with the local memory control program 10b (Step S111).

In the above, it is described about the operation of the information processing apparatus 100 according to the first embodiment in a case in which the processor 10 performs the local memory address acquirement process in order to access the data stored in the main memory 50 as shown in FIG. 6.

Next, description will be given to the operation of the information processing apparatus 100 according to the first embodiment in a case in which the processor 10 accesses the data copied onto the local memory 20 by using the local memory address acquired with an execution of the local memory address control program 10b as shown in FIG. 7.

In accordance with the application program 10a, first of all, the processor 10 reads, from the register, the local memory address acquired by the execution of the local memory control program 10b (Step S201).

Next, in accordance with the application program 10a, the processor 10 converts a base address (start address) for accessing the data copied onto the local memory 20 into the local memory address read from the register (Step S202).

The processor 10 calculates, for example, the main memory addresses (0xFFFF0000 to 0xFFFF02FF) of the data copied onto the local memory 20 by adding the base address (0xFFFF0000) and the offsets (0x00000000 to 0x000002FF).

In order to calculate the local memory addresses (0xA10000 to 0xA102FF) of the data copied onto the local memory 20, the processor 10 converts the base address into the local memory address (0xA1000) read from the register in accordance with the application program 10a. By performing the conversion, subsequently, the processor 10 calculates the local memory address of the data copied onto the local memory 20 by adding the base address (0xA10000) and the offsets (0x000000 to 0x0002FF).

Next, in accordance with the application program 10a, the processor 10 accesses the data copied onto the local memory 20 by using the base address (0xA10000) obtained after the conversion (Step S203).

More specifically, the processor 10 adds the base address (0xA10000) obtained after the conversion and the offsets (0x000000to 0x0002FF), thereby calculating the local memory addresses (0xA10000to 0xA102FF) of the data copied onto the local memory 20. Thus, in accordance with the application program 10a, the processor 10 accesses the data specified by the local memory address thus calculated, that is, the data copied onto the local memory 20.

The method of calculating the local memory addresses (0xA10000to 0xA102FF) of the data copied onto the local memory 20 and accessing by using the local memory address (0xA10000) read from the register is not limited to the above method.

Before the processor 10 performs a temporary stored data releasing process in accordance with the application program 10a to unlock the areas on the local memory 20 which are specified by the local memory addresses "0xA10000 to 0xA102FF", the replacement of the data stored in the areas with other data is prohibited. For this reason, the processor 10 can directly access many times by using the local memory address (0xA10000) acquired in the local memory address acquirement process without considering an influence of a data access through other processes for the data stored in the area of the local memory 20.

After the access is ended, the processor 10 stores the local memory address (0xA10000) and the size (784 bytes) in the register and starts the temporary stored data releasing process in accordance with the application program 10a (Step S204).

In accordance with the local memory control program 10b, subsequently, the processor 10 reads the local memory address and the size which are stored in the register. In accordance with the local memory control program 10b, then, the processor 10 sets, to "0", a lock flag of the management information (the tags 1-0, 1-1and 1-2) of the areas specified by the local memory address and the size which are stored in the local memory 20 (the local memory addresses "0xA10000 to 0xA102FF" and the cache lines 1-0, 1-1and 1-2) (Step S205).

In the above, it is described about the operation of the information processing apparatus 100 according to the first embodiment in a case in which the processor 10 accesses the data copied onto the local memory 20 by using the local memory address acquired with the execution of the local memory address control program 10b as shown in FIG. 7.

According to the information processing apparatus 100 according to the first embodiment, the processor 10 acquires the address indicative of the area of the local memory 20 in which the data on the main memory 50 are stored and performs a data access the local memory 20 by using the address so that the processor 10 can omit a determination whether the data are stored in the local memory 20 or not. Consequently, it is possible to increase a speed of an access from the processor 10 to the local memory 20.

Second Embodiment

In the first embodiment, it is described that the tag array on the local memory 20 has, for each cache line, the lock flag to be the information indicating whether the replacement of the data stored on the local memory 20 with the other data is prohibited or not.

However, for example, it is possible to store, in the local memory 20, a lock range array indicating that the replacement of data stored in an area (a lock range) on the local memory 20 specified by the local memory address and the size with the other data is prohibited.

Accordingly, an information processing apparatus 100 according to a second embodiment is different from that in the first embodiment in that a tag array on a local memory 20 does not have a lock flag and the local memory 20 further stores a lock range array indicating that the replacement of data stored in a lock range with the other data is prohibited. There will be omitted description of portions other than a portion (the local memory 20) for which the information processing apparatus 100 according to the second embodiment is different from the information processing apparatus 100 according to the first embodiment.

FIG. 8 shows the lock range array stored by the local memory 20 according to the second embodiment.

A local memory address (0xA10100) and a size (1024 bytes) are stored in the lock range array. This indicates that the replacement of the data stored in areas on the local memory 20 which are specified by local memory addresses (0xA10100 to 0xA104FF) with the other data is prohibited.

Similarly, a local memory address (0xA20200) and a size (4096 bytes) are stored in the lock range array. This indicates that the replacement of the data stored in areas on the local memory 20 which are specified by local memory addresses (0xA20200 to 0xA211FF) with the other data is prohibited.

Next, description will be given to an operation of the information processing apparatus 100 according to the second embodiment in a case in which a processor 10 performs a local memory address acquirement process in order to access data stored in a main memory 50. There will be omitted description of an identical operation to the information processing apparatus 100 according to the first embodiment.

Description will be given to a difference of the operation of the information processing apparatus 100 according to the second embodiment from the information processing apparatus 100 according to the first embodiment and the reason.

As a first difference, the processor 10 determines whether an area on the local memory 20 which is specified by a received main memory address and size has already been locked or not at Step S302 (the Step S102 in the first embodiment).

More specifically, in accordance with a local memory control program 10b, the processor 10 does not refer to a lock flag of a tag array corresponding to the area on the local memory 20 which is specified by the received main memory address and size but refers to the lock range array stored in the local memory 20, thereby determining whether the area has already been locked or not.

The processor 10 similarly determines, in accordance with the local memory control program 10b, whether there is any cache lines that is unlocked in other ways for an area that is specified by the main memory address and the size that are read from a register at Step S305 (the Step S105 in the first embodiment).

As a second difference, the processor 10 does not perform a lock process for a cache line in an area on the local memory 20 to which data on the main memory 50 are written at Step S308 (the Step S108 in the first embodiment).

The information processing apparatus 100 according to the second embodiment prohibits the replacement of the data stored in the area on the local memory 20 with the other data by using the lock range array in place of the lock flag of the tag for each cache line. After the data transfer process at S305 to S309 (the Steps S105 to S109 in the first embodiment) are ended, therefore, the processor 10 performs a lock process in a lump, that is, adds lock information to the lock range array in accordance with the local memory control program 10b (Step S311).

Next, description will be given to an operation of the information processing apparatus 100 according to the second embodiment in a case in which the processor 10 accesses data copied onto the local memory 20 by using a local memory address acquired with the execution of the local memory address control program 10b as shown in FIG. 7. Similarly, description will be given to a difference of the operation of the information processing apparatus 100 according to the second embodiment from the information processing apparatus 100 according to the first embodiment and the reason.

Figure 9:
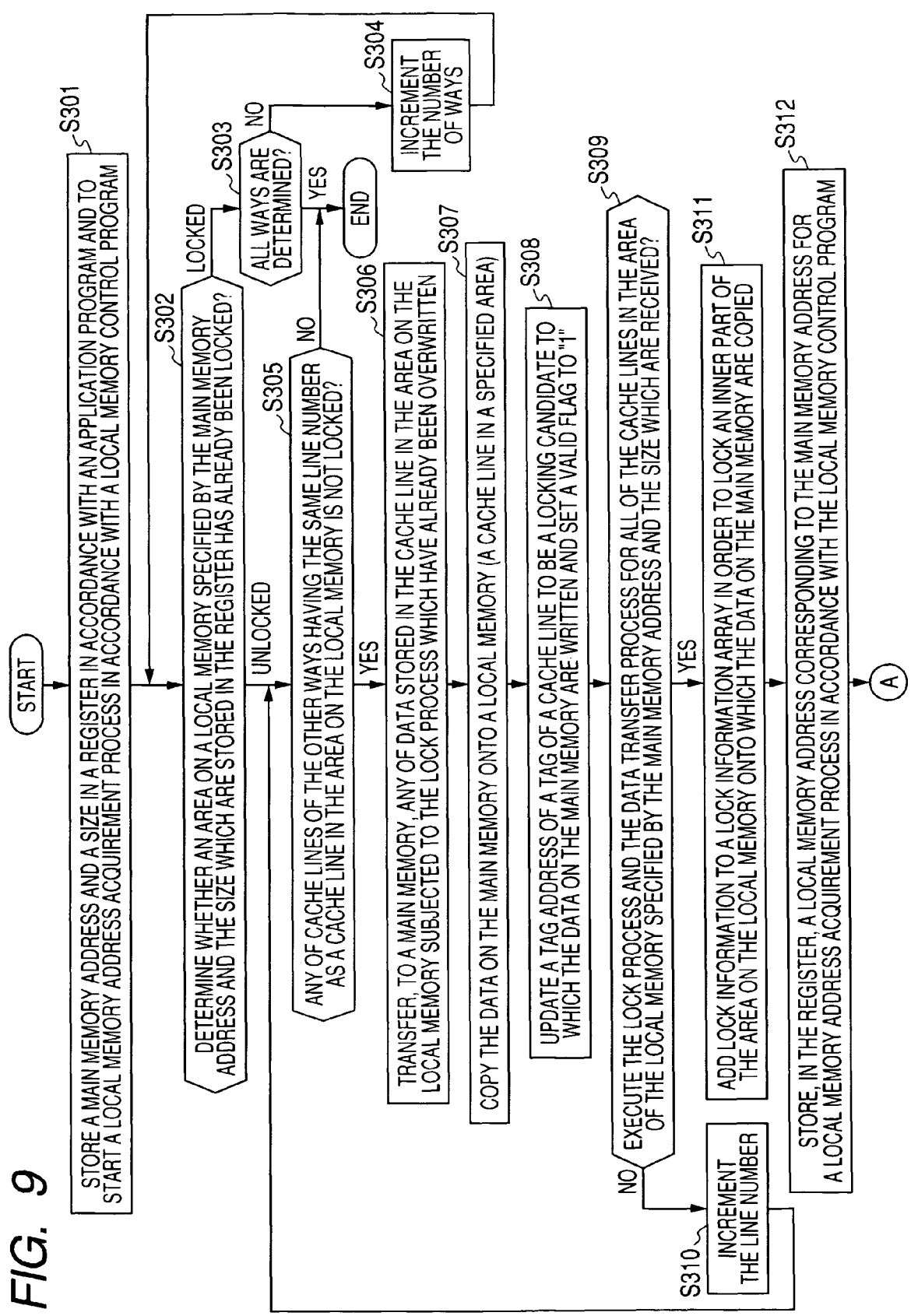
FIG. 9 is a flowchart showing a process performed by an information processing apparatus according to the second embodiment.
Figure 10:
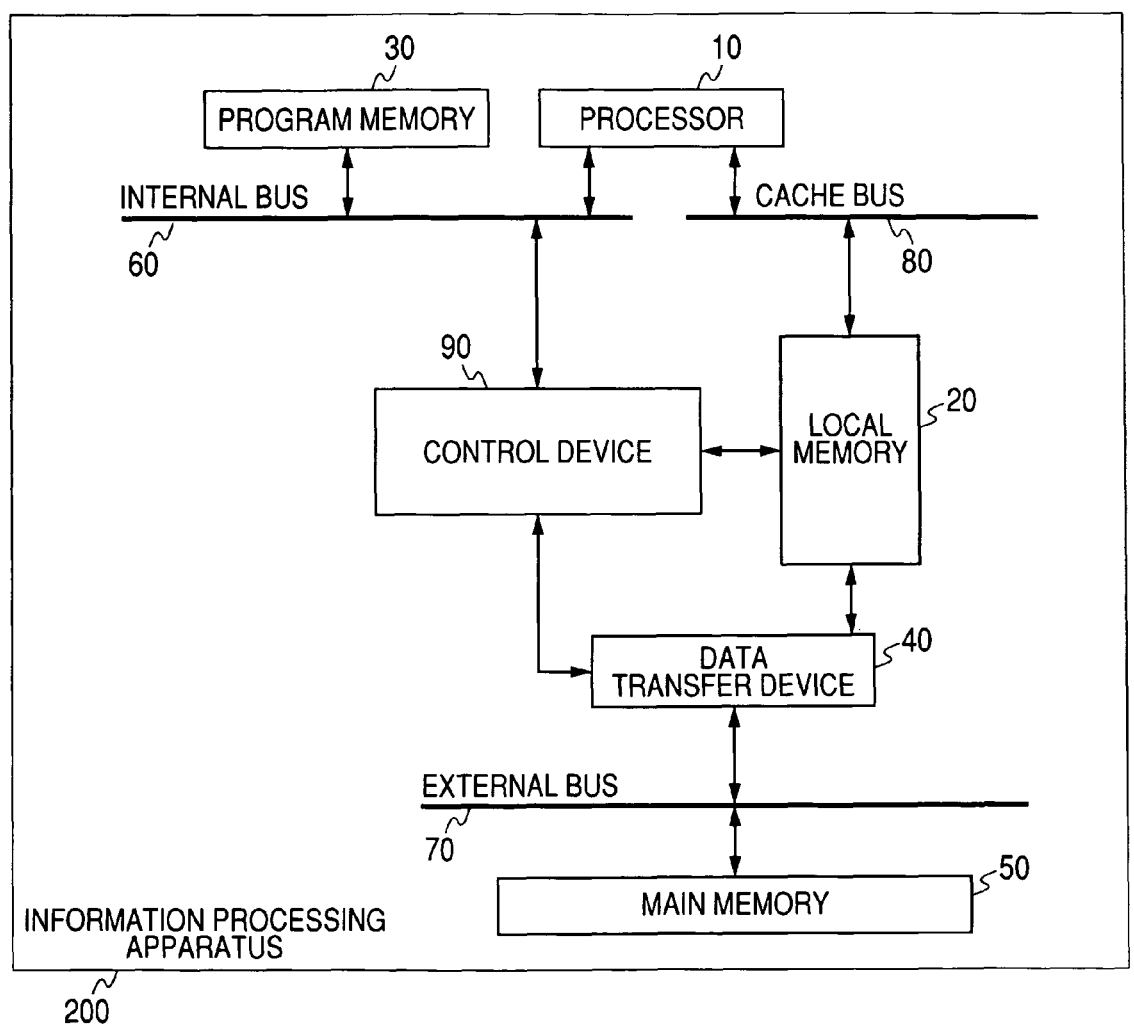
FIG. 10 is a block diagram showing a configuration of an information processing apparatus according to a third embodiment of the present invention.

As a third difference, there is taken a method of unlocking to be performed for an area locked on the lock memory 20 by the processor 10 in accordance with the local memory control program 10b at S204 in FIG. 7. This is implemented by causing the processor 10 to delete lock information added to the lock range array (Step S311 in FIG. 9) in accordance with the local memory control program 10b without setting a lock flag of a tag array in the area to "0".

In the information processing apparatus 100, the lock information is added to the lock range array every local memory address acquirement process to be performed through a transmission of the main memory address and the size and the lock information is deleted from the lock range array every temporary stored data releasing process to be performed through a transmission of the local memory address and the size so that it is possible to omit a determination whether data are stored in the local memory 20 or not and to reduce an overhead required for a lock process and an unlock process.

Third Embodiment

In the first embodiment, it is described that the local memory 20 temporarily stores the data on the main memory 50 to be accessed by the processor 10 and the local memory control program 10b to be executed by the processor 10 controls the local memory 20.

However, the local memory control program 10b may be implemented by a control device 90 configured to be a hardware.

An information processing apparatus 200 according to a third embodiment is different in that the apparatus further includes a control device 90 that accesses a tag array stored in a local memory 20 and transmitting a local memory address as a response to a local memory address acquiring request from a processor 10; and a cache bus 80 that allows the processor 10 to directly access the local memory 20 by using the local memory address received from the control device 90. The processor 10, a program memory 30 and the control device 90 are connected to each other through an internal bus 60. A data transfer device 40 and a main memory 50 are connected to each other through an external bus 70.

In the information processing apparatus 200 according to the third embodiment and the information processing apparatus 100 according to the first embodiment, the same portions (the processor 10, the local memory 20, the program memory 30, the data transfer device 40 and the main memory 50) have the same reference numerals and description thereof will be omitted.

Next, description will be given to an operation of the information processing apparatus 200 according to the third embodiment in a case in which a local memory address is acquired from the control device 90 and an access is made to data stored in the main memory 50. The description of the same operation as that of the information processing apparatus 100 according to the first embodiment will be omitted.

First, the processor 10 transmits a main memory address and a size to the control device 90 and outputs a local memory address acquiring request.

Next, the control device 90 receiving the local memory address acquiring request from the processor 10 performs a data transfer process and a lock process for an area on the local memory 20 which is specified by a main memory address and a size which are received from the processor 10. Then, the control device 90 transmits, to the processor 10, a local memory address of an area on the local memory 20 which is subjected to the lock process. Process (the data transfer process and the lock process) to be performed until the control device 90 transmits the local memory address as a response upon receipt of the local memory address acquiring request from the processor 10 is the same as the processing to be executed by the processor 10 in accordance with the local memory control program 10b according to the first embodiment.

Next, the processor 10 directly accesses data stored in the local memory 20 by using the local memory address received from the control device 90. A method of causing the processor 10 to directly access the data stored in the local memory 20 by using the local memory address is the same as that in the first embodiment.

Subsequently, the processor 10 transmits the local memory address and the size to the control device 90 and gives a temporary stored data releasing request. The control device 90 unlocks the area on the local memory 20 which is specified by the local memory address and the size received from the processor 10.

In the above, it is described about the operation of the information processing apparatus 200 according to the third embodiment in a case in which the processor 10 acquires the local memory address from the control device 90 and accesses the data stored in the main memory 50.

In the information processing apparatus 200 according to the third embodiment, the processor 10 acquires the address indicative of the area of the local memory 20 storing the data on the main memory 50 and performs a data access the local memory 20 by using the address. When accessing the local memory 20, consequently, the processor 10 can omit a determination whether the data are stored in the local memory 20 or not. By implementing the local memory control program 10b with the hardware "control device 90", it is possible to realize a higher speed processing.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A non-transitory computer-readable storage medium that stores a program for causing a processor to perform a process for accessing a local memory that caches a part of data stored in a main memory, the process comprising:
  acquiring (1) a first address that specifies a start address of a first area in the main memory where target data to be cached is stored and (2) range information that specifies a size of the first area in the main memory;
  converting a part of a bit string of the first address into a second address that specifies a start address of a second area in the local memory;
  copying the target data stored in the first area specified by the first address and the range information into the second area specified by the second address and the range information; and
  storing the second address to allow accessing of the target data copied into the local memory,
  wherein the first address and the range information are acquired by reading the first address and the range information from a register provided in the processor, the register storing data to be processed, and
  wherein the second address is stored by writing the second address to the register.

2. The storage medium according to claim 1, wherein the process further comprises prohibiting a replacement of the target data copied into the local memory with other data.

3. A non-transitory computer-readable storage medium that stores a program for causing a processor to perform a process for accessing a local memory that caches a part of data stored in a main memory, the process comprising:
  acquiring (1) a first address that specifies a start address of a first area in the main memory where target data to be cached is stored and (2) range information that specifies a size of the first area in the main memory;
  converting a part of a bit string of the first address into a second address that specifies a start address of a second area in the local memory;
  copying the target data stored in the first area specified by the first address and the range information into the second area specified by the second address and the range information; and
  storing the second address to allow accessing of the target data copied into the local memory,
  wherein the process further comprises prohibiting a replacement of the target data copied into the local memory with other data,
  wherein the target data copied into the local memory is stored by a cache line basis, and
  wherein the process further comprises storing management information into the local memory, the management information being assigned for each cache line and including lock information for prohibiting the replacement.

4. A non-transitory computer-readable storage medium that stores a program for causing a processor to perform a process for accessing a local memory that caches a part of data stored in a main memory, the process comprising:
  acquiring (1) a first address that specifies a start address of a first area in the main memory where target data to be cached is stored and (2) range information that specifies a size of the first area in the main memory;

converting a part of a bit string of the first address into a second address that specifies a start address of a second area in the local memory;

copying the target data stored in the first area specified by the first address and the range information into the second area specified by the second address and the range information; and storing the second address to allow accessing of the target data copied into the local memory, wherein the process further comprises prohibiting a replacement of the target data copied into the local memory with other data, wherein the process further comprises storing, into the local memory, (1) a lock address that specifies a start address of a lock area in the local memory where the replacement is prohibited and (2) lock range information that specifies a size of the lock area in the local memory, and wherein the replacement is prohibited for the target data copied into the lock area specified by the lock address and the lock range information.

5. A non-transitory computer-readable storage medium that stores a program for causing a processor to perform a process for accessing a local memory that caches a part of data stored in a main memory, the process comprising:

acquiring (1) a main memory address that specifies a start address of a first area in the main memory where target data to be cached is stored and (2) range information that specifies a size of the first area in the main memory;

converting the main memory address into a first address that specifies a start address of the local memory;

converting, while data stored in the local memory in an area specified by an [m-1]-th address of the local memory, where [m] is an integer larger than 1 having an initial value of 2, is prohibited to be replaced with other data, the main memory address into an [m]-th address of the local memory;

copying, when data stored in the local memory in an area specified by an [m]-th address of the local memory is not prohibited to be replaced with other data, the target data stored in the main memory in the first area specified by the main memory address and the range information into the local memory in an area specified by the [m]-th address and the range information; and storing the converted address to allow accessing of the target data copied into the local memory.

6. The storage medium according to claim 5, wherein the main memory address and the range information are acquired by reading the main memory address and the range information from a register provided in the processor, the register storing data to be processed, and wherein the converted address is stored by writing the converted address to the register.

7. The storage medium according to claim 5, wherein the main memory address and the range information are acquired by reading the main memory address and the range information from the local memory, and wherein the converted address is stored by writing the converted address to the local memory.

8. The storage medium according to claim 5, wherein the process further comprises prohibiting a replacement of the target data copied into the local memory with other data.

9. The storage medium according to claim 8, wherein the local memory is provided with a plurality of memory area groups, wherein each of the memory area groups is defined to have [m]-pieces of memory areas, and wherein when prohibiting the replacement, at least one of the [m]-pieces of memory areas defined in each of the memory area groups is allowed to be replaced with other data.

10. The storage medium according to claim 8, wherein the target data copied into the local memory is stored by a cache line basis, and wherein the process further comprises storing management information into the local memory, the management information being assigned for each cache line and including lock information for prohibiting the replacement.

11. The storage medium according to claim 8, wherein the process further comprises storing, into the local memory, (1) a lock address that specifies a start address of a lock area in the local memory where the replacement is prohibited and (2) lock range information that specifies a size of the lock area in the local memory, wherein the replacement is prohibited for the target data copied into the lock area specified by the lock address and the lock range information.

12. An information processing apparatus comprising:

a main memory that stores data;

a local memory that caches a part of the data stored in the main memory;

a processor that outputs a first address that specifies a start address of a first area in the main memory where target data to be accessed is stored; and a control device that operates to:

convert a part of a bit string of the first address into a second address that specifies a start address of a second area in the local memory;

copy the target data stored in the first area specified by the first address and the range information into the second area specified by the second address and the range information; and transmit the second address to the processor to allow the processor to access the target data copied into the local memory, wherein the first address and the range information are acquired by reading the first address and the range information from a register provided in the processor, the register storing data to be processed, and wherein the second address is stored by writing the second address to the register.

* * * * *